G. H. LEWIS.
REINFORCEMENT OF TIRE BASES.
APPLICATION FILED APR. 1, 1918.
1,281,601.
Patented Oct. 15, 1918.
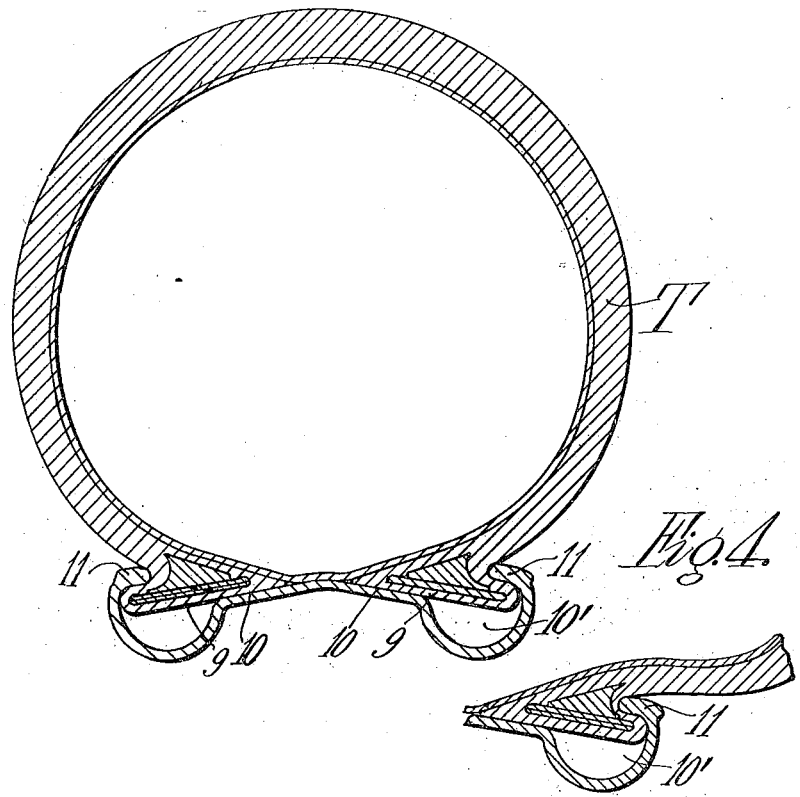
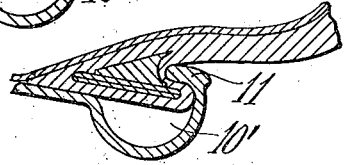
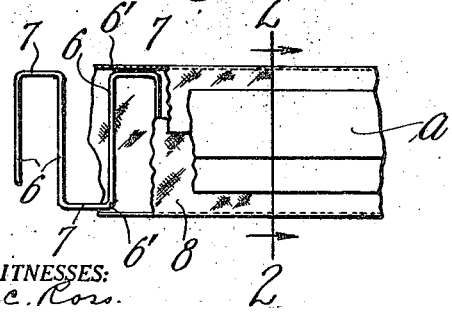
WITNESSES:
INVENTOR.
George H. Lewis.
BY
ATTORNEYS.

ated in a tire structure, but these pins are
UNITED STATES PATENT OFFICE.

GEORGE H. LEWIS, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

REINFORCEMENT OF TIRE-BASES.

1,281,601.  Specification of Letters Patent.  Patented Oct. 15, 1918.

Application filed April 1, 1918. Serial No. 225,999.

*To all whom it may concern:*

Be it known that I, GEORGE H. LEWIS, a citizen of the United States, and a resident of Chicopee Falls, in the county of Hampden and State of Massachusetts, have invented certain new and useful Improvements in Reinforcements of Tire-Bases, of which the following is a specification.

This invention relates to improvements in the reinforcement of the heel or base portions of tire casings, and is particularly adapted to the clencher type of casing which is usually constructed of rubberized fabrics and have in their base portions flexible filler members. An object of my invention is to provide a reinforcement to the filler members within the base portion of the casing which will anchor the rim-engaging portion against the wheel rim and will retain the bead portion of the tire in interlocked engagement with the clencher rings of the wheel rim, thereby preventing the accidental displacement of the casing when the tire is under stress. According to one feature of my invention, I provide a reinforcement that will securely anchor the wheel-rim-engaging portions and will permit of a free bending movement of the tire adjacent the clencher ring-engaging portions without disturbing the base or heel of the tire from its seat on the wheel rim.

I am aware that reinforcements consisting of short wire pins placed in a spaced-apart relation circumferentially about the base portion of the heel of the tire and in the flexible filler members have been incorporated in a tire structure, but these pins are not adapted to bond sufficiently during the vulcanization of the tire and work through the heel portion and into the tube of the tire, causing punctures of the tube and a general disintegration of the fabrics enveloping the flexible filler and reinforcement.

According to my invention, I provide a reinforcement of wire adapted to be incorporated in the tire structure during the process of manufacturing the tire carcass that will bond securely during vulcanization and has no sharp protrusions to work through the fabric and injure the tire or the inner tube.

In practice, my improved reinforcement may be used in any tire structure having base portions of the clencher type, but for illustrative purposes I have shown the preferred embodiment of my invention as incorporated in a clencher tire structure comprising a plurality of rubberized fabrics enveloping the flexible filler members in the usual and well-known manner.

By reference to the accompanying drawings, my reinforcement will now be described in one of its preferred forms.

Figure 1 is a cross-section through an inflated tire which is mounted on a wheel rim;

Fig. 2 is a cross-section through the reinforcement and on which is mounted the flexible filler member;

Fig. 3 is a partial plan view of the reinforcement; and

Fig. 4 is a fragmentary cross-section showing the tire under stress.

The reinforcement is preferably made by bending wire into the form shown in Fig. 3, wherein it will be seen that the laterally extending spaced members 6 of the reinforcement are alternately and oppositely connected at their ends by the circumferentially-disposed shorter members 7. The reinforcement is thus bent into the form shown, in lengths approximating the circumference of the base of the tire, and is completely enveloped in a sheathing of rubberized fabric 8, as shown in Fig. 3. The flexible filler member *a* is laid upon the inclosed reinforcement and on the overlapped edges of the fabric (see Fig. 2) and may be rolled or pressed thereon, which rolling or pressing action causes the filler member to adhere to the fabric, particularly since the filler member and fabric are rubberized, as well as forces the two thicknesses of fabric between the laterally-spaced members of the reinforcement and causes the whole to adhere firmly together, thereby locking the reinforcement within the fabric in such a manner that it will not move crcumferentially the tire casing more than the desired amount, as will be described, or laterally through the heel of the tire into the tube.

The construction of the reinforcement allows the laterally-spaced members to separate slightly by bending at the intersections 6' when the heel diameter is increased by stretching, as when the casing is removed or placed on the rim, but this elongation of the heel circumference is not sufficient to separate the members 7 to any appreciable extent and does not cause the reinforcement to separate from the fabric, since the fabric in itself is extensible enough for this purpose.

The filler member being thus reinforced at the base (see Fig. 2), is cut to a predetermined length, which length is substantially equal to the circumference of the heel portion of a tire casing, and is incorporated in the tire structure in the usual and well-known manner. A tire structure T embodying my reinforced flexible members is shown as being inflated and mounted on a section of a wheel rim in Fig. 1, wherein it will be seen that the flat heel portions 9 of the tire lie adjacent the wheel rim 10 and the clencher rings 11 of the rim are in interlocked engagement with the clencher beads of the tire. When the tire is thus mounted, it is held from displacement by the air pressure within, which pressure forces the flat heel portion firmly against the rim and outwardly toward the clencher rings 11. Pressure applied to the outer periphery of the tire tends to flatten the tire in the usual manner, but the heel of the tire, by reason of its being reinforced, particularly in the improved manner described, is prevented from bending down into the recesses 10′ of the wheel rim, and instead the tire will bend as it should around the clencher ring 11, as shown in Fig. 4, without causing a displacement of the base of the tire, or a working of the metal wire through the carcass into the inner tube, which action has been a serious disadvantage in prior structure.

What I claim is:—

1. In a clencher bead construction, the combination of the extensible bead filling member and on the bottom side thereof a circumferentially-arranged reinforcing means, comprising, a stiffening wire bent into closely spaced-apart portions extending transversely of and across the extensible bead member to resist transverse bending along a circumferential line, while the connecting bends of such transverse portions of the wire permit the desired circumferential stretching of bead construction, all for the purpose described.

2. In a clencher bead construction, the combination of the extensible bead filling member, and associated therewith a reinforcing means, comprising, a stiffening wire arranged in closely spaced-apart portions extending transversely of and across the extensible bead member to resist transverse bending along a circumferential line, while the connecting bends of such transverse portions of the wire permit the desired circumferential stretching of the bead construction, all for the purpose described.

3. In a clencher bead construction, the combination of the extensible bead filling member and associated therewith a reinforcing means, comprising, a stiffening wire arranged in closely spaced-apart portions extending transversely of and across the extensible bead member to resist transverse bending along the circumferential line, while the connecting bends of such transverse portions of the wire permit the desired circumferential stretching of the bead construction, and two fabric layers, one above and the other below the reinforcing means to cover the same, said layers being joined together intermediate the said spaced-apart portions of the wire, whereby the latter is effectively pocketed, all for the purpose described.

4. In a clencher bead construction, the combination of an extensible bead filling member and on the bottom side thereof a circumferentially-arranged reinforcing means, comprising, a stiffening wire located between two layers of rubberized fabric, the whole being pressed tightly together, said stiffening wire being bent into closely spaced-apart portions extending transversely of and across the extensible bead member to resist transverse bending along a circumferential line, while the connecting bends of said transverse portion of the wire permit the desired circumferential stretching of the bead construction, and said rubberized fabric layers serve to effectively pocket the stiffening wire and connect it with the bead filling member, all for the purpose described.

5. In a clencher bead construction, the combination of the extensible bead filling member, a reinforcing means, comprising a stiffening wire bent into closely spaced-apart portions arranged around the entire circumference of the bead and transversely therewith, and connecting bends between such spaced apart portions to permit circumferential stretching of the bead construction, and a fabric wrapping arranged entirely around the reinforcing means to serve when pressed tightly against the bottom of the bead filling member as a connecting means between the latter and the wire, and a pocketing means for the wire, all for the purpose described.

GEORGE H. LEWIS.